United States Patent Office
3,016,379
Patented Jan. 9, 1962

3,016,379
PRODUCTION OF TRIMETHYLENEUREA
Billy E. Lloyd, Memphis, Tenn., assignor to Allied Chemical Corporation, New York, N.Y., a corporation of New York
No Drawing. Filed Mar. 24, 1960, Ser. No. 17,265
4 Claims. (Cl. 260—251)

The present invention relates to a simple and economical process for the production of trimethyleneurea (tetrahydropyrimidinone-2).

Trimethyleneurea may be represented by the following formula:

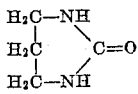

The process of this invention is carried out by heating a member of the group consisting of mono(3-aminopropyl) isocyanurate and bis(3-aminopropyl) isocyanurate at temperature of about 165° to 300° C., preferably about 165° to 250° C., thereby forming a reaction mixture comprising trimethyleneurea and recovering said trimethyleneurea from the reaction mixture.

Mono- and bis(3-aminopropyl) isocyanurates may be prepared by catalytic hydrogenation of bis- and tris(2-cyanoethyl) isocyanurates in the presence of ammonia, as described in my copending application, Serial No. 17,264, of even date. Bis- and tris(2-cyanoethyl) isocyanurates may be prepared by reacting cyanuric acid with acrylonitrile in a reaction medium which is a solvent for the reactants and for the 2-cyanoethyl isocyanurates and which contains a small amount of strongly alkaline material as catalyst, as described in application Serial No. 814,671 of Alexander Sadle, filed May 21, 1959. The relative yields of bis(2-cyanoethyl) isocyanurate and tris-(2-cyanoethyl) isocyanurate can be controlled by varying the proportion of acrylonitrile to cyanuric acid employed and the duration of the reaction. With amounts of acrylonitrile in excess of 3 mols per mol of cyanuric acid, the yield of tris(2-cyanoethyl) isocyanurate is much greater than that of bis(2-cyanoethyl) isocyanurate, and especially when the reaction mixture is maintained at reaction temperature for a sufficient time to permit the cyanoethylation to go to completion. Since tris(2-cyanoethyl) isocyanurate is less soluble than bis(2-cyanoethyl) isocyanurate, they can be separated by fractional crystallization from a solvent.

Optimum yields of trimethyleneurea are obtained by carrying out the reaction at the preferred temperature of about 165° to 250° C. At temperature below about 165° C., little or no reaction occurs. Moreover, at temperature above about 300° C., the product tends to decompose resulting in unacceptably low yields.

The reaction is preferably carried out at low pressure, whereby trimethyleneurea distills over in vapor form. At the preferred temperature of about 165° to 250° C., desirable pressure ranges from about 0.15 to 3 mm. of mercury. Under these low pressure conditions, trimethyleneurea distills from the reaction zone in vapor form and is then condensed to form a white solid melting at about 260° to 265° C.

Additional purification of the trimethyleneurea may be accomplished by recrystallization from inert organic solvents, particularly alcohols such as methyl alcohol, n-propyl alcohol, isopropyl alcohol and mixtures thereof with water, to give trimethyleneurea product melting at about 263° to 265° C.

If desired, the reaction may be carried out at atmospheric pressure. In such case, the trimethyleneurea product is retained in the reaction mixture and may be recovered by crystallization from inert organic solvents such as those recited above.

The following examples of the invention, in which parts are by weight, are given for purposes of illustration only. It will be understood that the invention is not limited to these examples.

EXAMPLE 1

(A) Preparation of bis(3-aminopropyl) isocyanurate

A stainless steel autoclave containing 50 parts of tris-(2-cyanoethyl) isocyanurate, 17.1 parts of Raney nickel and 61.3 parts of anhydrous ammonia was pressurized to 1400 pounds per square inch gauge with hydrogen and heated to 80–82° C. for 5 hours. Additional hydrogen was added as the reaction proceeded to maintain the pressure at about 1200 pounds per square inch gauge. At the end of the reaction period, the autoclave was cooled and vented. The product was washed from the autoclave with about 250 parts of absolute ethyl alcohol. The catalyst was filtered off, and the ethyl alcohol was then evaporated to give crude bis(3-aminopropyl) isocyanurate as a syrupy mass.

(B) Preparation of trimethyleneurea 24 parts of syrupy crude bis(3-aminopropyl) isocyanurate, prepared as described in A, were placed in the pot of a glass still arranged for distillation under reduced pressure. The pot was gradually heated to 250° C. while maintaining the pressure at 1 to 2 mm. of mercury. Trimethyleneurea distilled in vapor form at pot temperature of 165–250° C. The vapor was then condensed to form 16 parts of trimethyleneurea, representing a yield of 85% of theory based on the bis(3-aminopropyl) isocyanurate charged. After recrystallization from ethyl alcohol, the product melted at 263° C.

EXAMPLE 2

(A) Preparation of mono(3-aminopropyl) isocyanurate

A stainless steel autoclave was charged with 43 parts of tris(2-cyanoethyl) isocyanurate, 15.6 parts of Raney nickel, 18.1 parts of anhydrous ammonia and 79 parts of absolute ethyl alcohol. The autoclave was pressurized to 2000 pounds per square inch gauge with hydrogen and heated at 155–160° C. for 3 hours. Additional hydrogen was added as the reaction proceeded to maintain the pressure at 1000–2000 pounds per square inch gauge. The autoclave was then cooled, vented and washed out with a large quantity of absolute ethyl alcohol. The catalyst was filtered off and the solution concentrated to give 15 parts of crude mono(3-aminopropyl) isocyanurate as a syrupy mass.

(B) Preparation of trimethyleneurea

About 20 parts of syrupy crude mono(3-aminopropyl) isocyanurate, prepared as described in A, was placed in the pot of a glass still arranged for distillation under reduced pressure. The pot was gradually heated to 250° C. while maintaining the pressure at 1 to 2 mm. of mercury. Trimethyleneurea distilled in vapor form at pot temperature of 165–250° C. The trimethyleneurea vapor was then condensed to form 10 parts of trimethyleneurea, representing a yield of 93% of theory based on the mono-(3-aminopropyl) isocyanurate charged. After recrystallization from ethyl alcohol, the product melted at 263–265° C. The product was identified by infrared spectrum analysis and by hydrobromic acid hydrolysis to 1,3-diaminopropane.

Trimethyleneurea may be reacted with formaldehyde to form dimethylol trimethyleneurea, a textile resin that makes effective crease-resistant finishes on cotton goods.

Since various changes and modifications may be made

I claim:

1. A process for producing trimethyleneurea which comprises heating a member of the group consisting of mono(3-aminopropyl) isocyanurate and bis(3-aminopropyl) isocyanurate at temperature in the range of about 165° to 300° C., thereby forming a reaction mixture comprising trimethyleneurea and recovering said trimethyleneurea from the reaction mixture.

2. A process for producing trimethyleneurea which comprises heating a member of the group consisting of mono(3-aminopropyl) isocyanurate and bis(3-aminopropyl) isocyanurate at temperature in the range of about 165° to 250° C., thereby forming a reaction mixture comprising trimethyleneurea and recovering said trimethyleneurea from the reaction mixture.

3. A process for producing trimethyleneurea which comprises heating mono(3-aminopropyl) isocyanurate at temperature in the range of about 165° to 250° C. and at pressure in the range of about 0.15 to 3 mm. of mercury, whereby the trimethyleneurea is produced in vapor form, and condensing and recovering said trimethyleneurea.

4. A process for producing trimethyleneurea which comprises heating bis(3-aminopropyl) isocyanurate at temperature in the range of about 165° to 250° C. and at pressure in the range of about 0.15 to 3 mm. of mercury, whereby the trimethyleneurea is produced in vapor form, and condensing and recovering said trimethyleneurea.

No references cited.